United States Patent [19]

Anquetin

[11] Patent Number: 4,657,456
[45] Date of Patent: Apr. 14, 1987

[54] BLIND SCREW ANCHOR

[75] Inventor: Robert Anquetin, Etrechy, France

[73] Assignee: USM Corporation, Farmington, Conn.

[21] Appl. No.: 613,579

[22] Filed: May 24, 1984

[30] Foreign Application Priority Data

Jun. 3, 1983 [GB] United Kingdom ............... 8315350

[51] Int. Cl.$^4$ ............................................. F16B 13/04
[52] U.S. Cl. ....................................... 411/38; 411/61
[58] Field of Search ................... 411/34, 35, 36, 37, 411/38, 61, 63, 64, 65, 66

[56] References Cited

U.S. PATENT DOCUMENTS

| | | | |
|---|---|---|---|
| 907,393 | 12/1908 | Newhall | 411/64 |
| 1,208,999 | 12/1916 | Malaby | 411/34 |
| 1,293,844 | 2/1919 | Malaby | 411/36 |
| 2,293,491 | 8/1942 | Cox | 411/61 |
| 2,401,427 | 6/1946 | Kimbell | 411/38 |
| 2,409,702 | 10/1946 | Luce | 411/38 |
| 2,559,281 | 7/1951 | Croessant | 411/38 |
| 2,753,750 | 7/1956 | Dempsey | 411/67 |
| 2,762,252 | 9/1956 | Karitzky | 411/38 |
| 3,363,501 | 1/1968 | Modrey | 411/37 |
| 3,888,156 | 6/1975 | Fima | 411/38 |
| 3,910,156 | 10/1975 | Soltysik | 411/61 |

FOREIGN PATENT DOCUMENTS

| | | | |
|---|---|---|---|
| 212600 | 7/1956 | Australia | 411/38 |
| 1312011 | 11/1962 | France | 411/37 |
| 19453 | 9/1903 | United Kingdom | 411/61 |
| 820739 | 9/1959 | United Kingdom | 411/61 |
| 1217850 | 1/1969 | United Kingdom | 411/55 |
| 1505595 | 3/1978 | United Kingdom | 411/38 |

*Primary Examiner*—Gary L. Smith
*Assistant Examiner*—Rodney M. Lindsey
*Attorney, Agent, or Firm*—William F. White

[57] ABSTRACT

A blind screw anchor, made of one piece of metal, has a shank, constituted by sleeve portions connected together by uniformly spaced links. A head flange is integrally connected to an adjacent sleeve portion at one end of the shank by a bridge piece bent at right angles to bring the head flange against the shank at that end. A tail cap piece is similarly connected to the sleeve portion at the other end of the shank and bent into abutting engagement therewith.

The anchor, made of one piece of sheet metal, is economical to manufacture in a multistage strip forming press. It is especially useful for securing articles to hollow partition walls.

11 Claims, 7 Drawing Figures

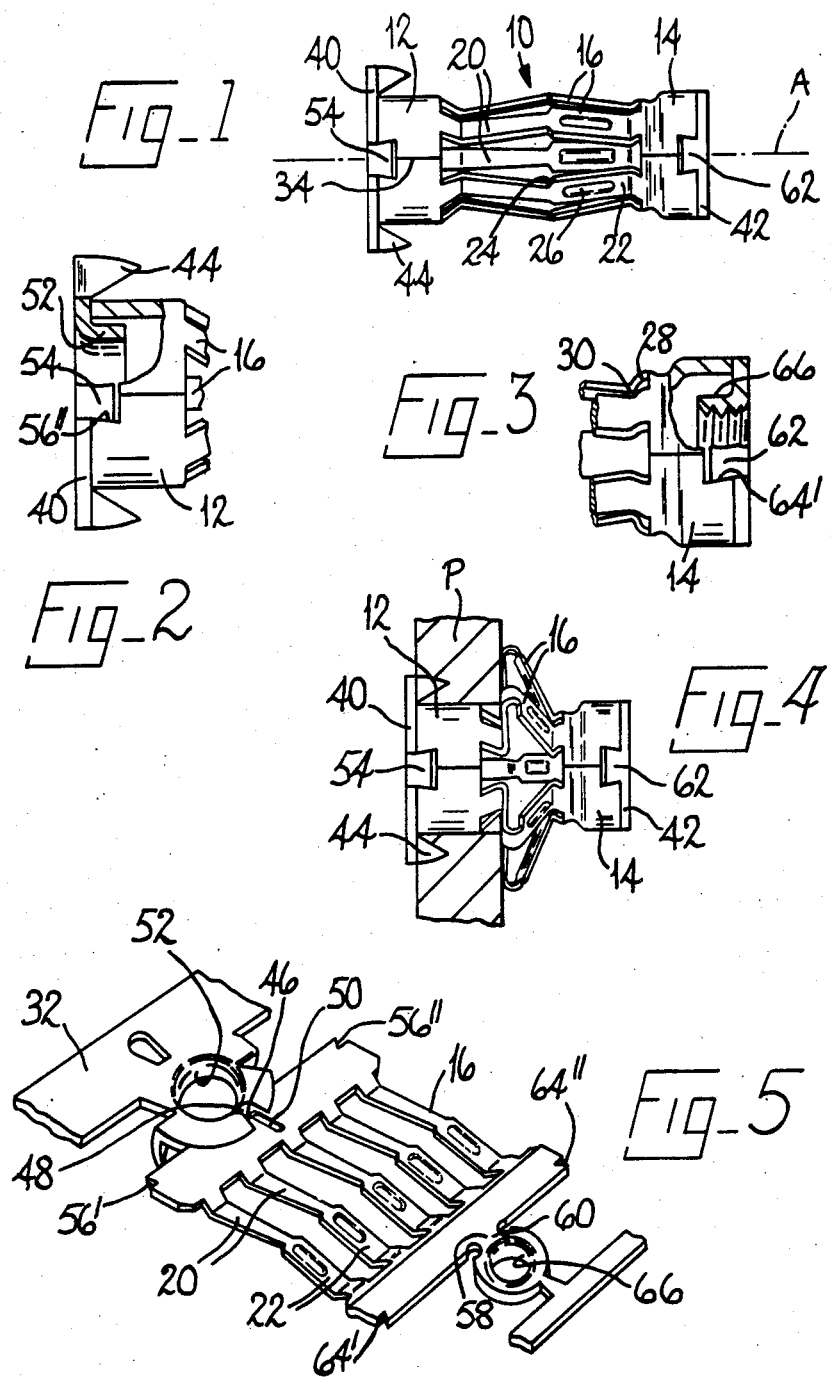

BLIND SCREW ANCHOR

FIELD OF THE INVENTION

This invention is concerned with a blind screw anchor comprising two cylindrical sleeve portions in axial alignment joined together by collapsible links uniformly spaced about the axis of the anchor, one sleeve portion having an outwardly projecting flange to serve as a head of the anchor, and the other being provided with means to engage the thread of a screw which freely passes through the head.

BACKGROUND OF THE INVENTION

Blind screw anchors of the kind referred to are commercially available for securing articles to hollow panels, for example, now widely used for partition walls in industrial buildings, office blocks and domestic dwellings. A hole is drilled through the skin, usually plasterboard or hardboard, at the accessible side to permit introduction of the anchor, which is then set by pulling the threaded end toward the head to collapse the links. Such pulling can be effected either by the screw which will subsequently be used to secure the article or by a threaded mandrel of a suitable tool. On collapse, the links spread out to hold the skin of the panel against the head of the anchor. The head may have prongs arranged to penetrate the skin to prevent the anchor from rotating when a screw is threaded into it.

A blind screw anchor of the aforementioned kind is available commercially under the Registered Trademark "MOLLY". It is a reliable and effective fastener which is easy to install. It is made from three separate sheet metal parts, namely, a head, a shank, and a nut portion. All three parts are welded together. The manufacturing cost of the fastener is thus relatively high.

OBJECT OF THE INVENTION

It is an object of the present invention to provide a blind screw anchor of the aforementioned kind which is as reliable, effective and as easy to install as the presently available "MOLLY" anchor, but which is more economical to manufacture.

SUMMARY OF THE INVENTION

The invention provides, in one of its several aspects, a blind screw anchor of the kind referred to which is made up of one piece of sheet metal, of which (a) the sleeve portions and links are bent around a common axis so as to form a shank of the anchor, (b) the head flange, with a hole through it for the screw, is folded about a hinge line to abut the sleeve portion at one end of the shank, and (c) the means to engage the screw thread is formed in a tail cap piece folded about a hinge line to abut the sleeve portion at the other end of the shank.

Preferably, an anchor in accordance with the invention has a dovetailed lug projecting from the tail cap piece which is accommodated in a complementary undercut recess in the abutting edge of the adjacent sleeve portion, the lug being preferably disposed diametrically opposite said hinge line of the tail cap piece, the recess being formed in the adjacent sleeve portion partly at one side and partly at the other of a line along which longitudinal edges of the sleeve portion meet. The head portion may also have a lug, which may be dovetailed, similarly accommodated in a recess in the adjacent sleeve portion.

Both the tail cap piece and the head flange, or either of them, of a fastener in accordance with the invention may have the metal formed into a tubular shape around a central hole, that at the tail cap portion being tapped to receive the thread of a screw. Preferably also, the hinge lines referred to are provided in narrow links which are bent through 90°.

The invention also provides, in another of its aspects, a method of making not just one blind screw anchor as set out in the last preceding paragraph but two, which includes the steps of progressively punching and shaping a strip of metal to form the outline shapes to provide the cylindrical sleeve portions, the collapsible links, the head flange and the tail cap piece, bending the sleeve portions and links around a common axis to form a shank, and folding the head flange and tail cap piece through 90° about hinge lines transverse to the direction of said axis to abut the ends of the sleeve portions.

Preferably, a method in accordance with the invention comprises the further step of bending lugs on the head flange and tail cap piece so that they are received in complementary recesses of the adjacent sleeve portions.

BRIEF DESCRIPTION OF THE DRAWINGS

The above and other features of the invention will now be particularly described with reference to the accompanying drawings, in which:

FIG. 1 is a side view of the illustrative blind screw anchor;

FIG. 2 is a view, on a larger scale than FIG. 1 and partly in section, of a head end portion of the anchor;

FIG. 3 is a view similar to FIG. 2, but of a tail end portion of the anchor;

FIG. 4 is a side view of the anchor after it has been set in a panel;

FIG. 5 is a view of a portion of metal strip shown at a stage in a multistage punching and forming operation employed in manufacturing the illustrative fastener;

DESCRIPTION OF THE PREFERRED EMBODIMENT

Figure 6:
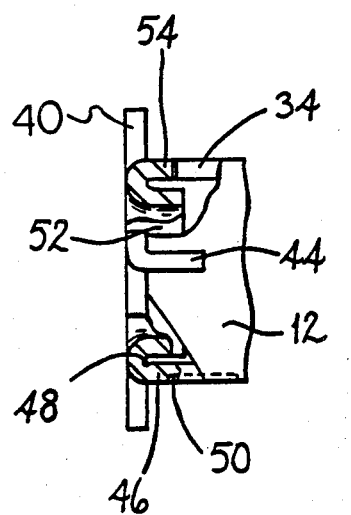
FIG. 6 is a cross-sectional view of the head end portion of the anchor.

The illustrative blind screw anchor is made of one piece of sheet metal and comprises a shank 10 (FIG. 1) constituted by a sleeve portion 12 at one end (a head end) of the shank, a sleeve portion 14 at the other end (the tail end) of the shank, and five links 16 uniformly spaced apart around a common axis A of the shank and connecting the sleeve portions 12 and 14.

The links 16 of the illustrative anchor are all of the same shape, each having a narrow part 20 joined to the head sleeve portion 12 of the shank and a broader, parallel sided, part 22 joined to the tail sleeve portion 14. The part 20 of each link 16 is slightly longer than the part 22 and tapers slightly in width toward shoulders 24 at which the two parts meet. Each broader part 22 has a central longitudinally disposed rib 26 pressed into it; that is to say, the metal is deformed to provide an elongated ridge on one side and corresponding depression on the other, the depressions facing outwardly of the shank. Each link is also shaped longitudinally so that, traversing the link from the tail sleeve portion 14 to the head sleeve portion 14, the link first bends sharply inwardly at 28 for a short distance at 45° toward the axis of the shank, then bends outward and remains straight until at the shoulders 24, it turns inward against toward the shank, remaining straight and at an angle of 72° to the axis A (which is slightly steeper than that of the portion 20) until it bends sharply outward at 30 at an angle of 45° for a shorter distance than the inwardly directed portion at 28 adjacent sleeve portion 14 to meet the sleeve portion 12. The circle circumscribing the links 16 at the shoulders 24 is the same as the diameters of the two sleeve portions 12,14.

The manufacture of the illustrative anchor is partially illustrated in FIG. 5 wherein flat sheet metal in the form of a strip 32, substantially wider than the length of the shank 10, is progressively punched and formed to provide the shaped links integral with flat portions of metal which will form the sleeve portions 12 and 14. These parts are then bent around the common axis A until longitudinal edges of the sleeve portions 12,14 meet along a line 34 (FIG. 1).

Meanwhile, in the manufacture of the illustrative anchor, a head flange 40 has been cut out and formed to desired shape at one end of the shank, and a tail cap piece 42 at the other. Referring first to the head flange 40, shown in FIG. 2, it comprises a flat circular flange of larger diameter than the sleeve portion 12, having a wide margin from which two prongs 44 are stamped out to project at right angles in radial planes toward the tail end of the shank. When the anchor is used, the prongs 44 penetrate the surrounding material and prevent the anchor from rotating. The flange 40 is connected to the sleeve portion 12 by a narrow bridge piece 46 bent at right angles along a hinge line 48; to ensure that the right angled bend occurs at the selected hinge line, the metal strip is indented deeply along this line on the inside of the strip and the bridge piece 46 has a longitudinal rib 50 pressed into it. This is clearly shown in the cross-sectional view of the head end portion in FIG. 6. Referring to FIG. 2, it is seen that the aforementioned right angle bend in the narrow bridge piece 46 establishes a perpendicular relationship between the head flange 40 and the common axis A.

While the head flange 40 is still lying flat in the strip, a hole punched in the center of it is enlarged by forming a tubular skirt 52 which, where the flange is bent about the hinge line 48, comes to lie coaxially within the sleeve portion 12. Such bending takes place until the flange abuts the end of the portion 12. At such time, a dovetail-shaped lug 54 diametrically opposite the bridge piece 46 and projecting at right angles to the flange is received within an undercut recess provided in part by a cut-out 56' in the sleeve portion at one side of the line 34 and in part by a cut-out 56" symmetrically disposed at the other side. In the manufacture of the illustrative anchor, the head flange 12 is bent over and the lug 54 is disposed between the cut-outs before the shank is bent around to completely close the gap along the line 34.

Figure 7:
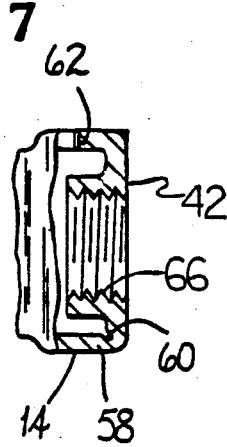
FIG. 7 is a cross-sectional view of the tail end portion of the anchor.

At the other end of the shank, the tail cap piece 42 is similarly stamped and formed from the flat strip integrally with the shank 10. The cap piece 42 is circular and of the same diameter as the sleeve portion 14 to which it is attached by a bridge piece 58 bent at right angles along a hinge line 60. Sharpness of the bend is ensured by indenting the metal deeply along the line on the inside of the bend. This is clearly shown in the cross-sectional view of the tail end portion in FIG. 7. Referring to FIG. 3, it is seen that the aforementioned right angle bend in the bridge piece 58 establishes a perpendicular relationship between the tail cap piece 42 and the common axis A. Thus, the tail cap piece 42 is brought into abutting relationship, concentrically, with the sleeve portion 14 just before the sleeve portion is closed on the line 34 so that a dovetail-shaped lug 62 projecting at right angles from the cap piece is received in an undercut recess provided by two cut-outs 64', 64" in the abutting edges of the sleeve portion 14. It is to be appreciated that the recess formed by the cut-outs 64' and 64" is like the recess formed by the cut-outs 56' and 56".

In the advance of the strip in the strip press, a hole in the middle of the tail cap before it was bent over at the hinge line 60, was enlarged by the formation of a tubular skirt 66 which comes to lie coaxially within the sleeve portion 14. This skirt is subjected, preferably as a separate operation after removal of the anchor from the strip, to tapping, which forms an internal screw thread in the skirt 66. After plating to reduce the tendency for corrosion, the illustrative anchor is complete.

The illustrative anchor is intended primarily for securing articles to wall panels of buildings, especially to the exposed skin of hollow walls. Such a skin is shown at P in FIG. 4. A hole is drilled through the skin of the panel, which is just large enough to allow the shank 10 of the anchor to be pushed through it, preferably until the prongs 44 penetrate the surface of the skin. The anchor may then be set, either by using a machine screw (for example the one which will ultimately secure the article) or by a screw-threaded mandrel of a setting tool which will pull the mandrel while pushing on the head flange of the anchor. On so setting, the links 16 of the anchor bend outwardly at their junctions with the sleeve portions (where the metal may be indented with a transverse groove to facilitate such bending) and collapse longitudinally by bending at the shoulders 24.

Thus, the narrow parts 20 of the links come to lie against the blind side of the skin of the panel and the wider parts 22 serve as inclined struts to brace them there.

As will be seen from the foregoing description, the manufacture of the illustrative anchor is economical due to its being made of one piece of sheet metal, while yet being easy to install and providing a reliable and effective fixing. It is furthermore to be appreciated that illustrative anchor which has been described may be changed without departing from the scope of the claimed invention.

What is claimed is:

1. A blind screw anchor fabricated from one piece of sheet metal that is bent and folded so as to form the component parts of the blind screw anchor, said blind screw anchor comprising:

a first sleeve portion formed around a common axis for all component parts of the blind screw anchor, said first sleeve portion having abutting lengthwise edges that meet so as to complete a cylindrical shape;

a head flange with a hole therein having a center through which the common axis passes, said head flange being integrally connected to said first sleeve portion by a bent bridge piece so as to cause said head flange to lie in a plane perpendicular to the common axis, a second sleeve portion formed around the common axis for all component parts of the blind screw anchor, said second sleeve portion having abutting lengthwise edges that meet so as to complete a cylindrical shape;

a plurality of collapsible links spaced symmetrically around the common axis for all component parts of the blind screw anchor, said plurality of collapsible links being integrally connected to said first and second sleeve portions; and means to engage the screw threads of a screw passing through the head flange, down through the first sleeve portion, the collapsible links, and the second sleeve portion along the common axis for all component parts of the screw anchor, said thread engaging means being integrally connected to said second sleeve portion by a bent bridge piece between said thread engaging means and said second sleeve portion that is bent at an angle relative to said second sleeve portion so as to cause said thread engaging means to be in a plane perpendicular to the common axis.

2. The blind screw anchor of claim 1 further comprising:

a lug formed at the periphery of said thread engaging means opposite the bridge piece between said thread engaging means and said second sleeve portion, said lug engaging a complementary recess formed in said second sleeve portion so as to maintain the perpendicular relationship of said thread engaging means with respect to the common axis.

3. The blind screw anchor of claim 2 wherein said recess formed in said second sleeve portion comprises:

a pair of recess portions formed in said second sleeve portion to either side of the lengthwise abutting edges in said second sleeve portion.

4. The blind screw anchor of claim 2 wherein said lug formed at the periphery of said thread engaging means is dovetailed in shape.

5. The blind screw anchor of claim 1 wherein said bent bridge piece between said second sleeve portion and said thread engaging means has a deeply indented groove defining the line at which said bridge piece between said second sleeve portion and said thread engaging means is bent to an angle of ninety degrees with respect to said second sleeve portion.

6. The blind screw anchor of claims 1 or 2 further comprising:

a lug formed at the periphery of said head flange opposite said bent bridge piece between said head flange and said first sleeve portion, said lug formed at the periphery of said head flange engaging a complementary recess in said first sleeve portion so as to maintain said head flange perpendicular to the common axis.

7. The blind screw anchor of claim 6 wherein said recess formed in said first sleeve portion comprises:

a pair of recess portions formed in said first sleeve portion to either side of the lengthwise abutting edges in said first sleeve portion.

8. The blind screw anchor of claim 7 wherein said lug formed at the periphery of said head flange is dovetailed.

9. The blind screw anchor of claim 1 wherein said thread engaging means comprises:

a piece having a tubular shaped central opening therein aligned with respect to the central axis of the component parts of the screw anchor, said tubular shaped central opening having tapped threads therein to threadably engage a screw.

10. The blind screw anchor of claims 1 or 9 wherein the hole in said head flange comprises:

a tubular shaped opening formed in said head flange so as to receive and guide a screw inserted therein.

11. The blind screw anchor of claim 1 wherein said bent bridge piece between said first sleeve portion and said head flange has a deeply indented groove defining the line at which said bridge piece between said first sleeve portion and said head flange is bent to an angle of ninety degrees with respect to said first sleeve portion.

* * * * *